United States Patent [19]

Komatsu et al.

[11] Patent Number: 5,508,240

[45] Date of Patent: Apr. 16, 1996

[54] ALUMINUM NITRIDE SINTERED BODY AND METHOD FOR MANUFACTURING THE SAME

[75] Inventors: Michiyasu Komatsu; Takao Shirai, both of Yokohama, Japan

[73] Assignee: Kabushiki Kaisha Toshiba, Kawasaki, Japan

[21] Appl. No.: 246,763

[22] Filed: May 20, 1994

[30] Foreign Application Priority Data

May 21, 1993 [JP] Japan ..................... 5-142871
Dec. 20, 1993 [JP] Japan ..................... 5-344922

[51] Int. Cl.⁶ ............................................. C04B 35/581
[52] U.S. Cl. ............................... 501/96; 501/97; 501/98
[58] Field of Search ..................... 501/96, 97, 98, 501/154

[56] References Cited

U.S. PATENT DOCUMENTS

| 4,833,108 | 5/1989  | Mizuno et al.   | 501/96 |
| 4,908,173 | 3/1990  | Schwetz et al.  | 501/96 |
| 4,997,798 | 3/1991  | Okuno et al.    | 501/96 |
| 5,001,089 | 3/1991  | Kasori et al.   | 501/96 |
| 5,077,245 | 12/1991 | Miyahara        | 501/96 |
| 5,219,803 | 6/1993  | Yamakawa et al. | 501/96 |
| 5,294,388 | 3/1994  | Shimoda et al.  | 501/96 |

FOREIGN PATENT DOCUMENTS

| 0237072 | 9/1987  | European Pat. Off. . |
| 0287841 | 10/1988 | European Pat. Off. . |
| 0312419 | 4/1989  | France .             |
| 3337630 | 4/1985  | Germany .            |

OTHER PUBLICATIONS

Database WPI, Derwent Publications Ltd., AN 90 167423, JP-A-02 107 571, Apr. 19, 1990.

*Primary Examiner*—Mark L. Bell
*Assistant Examiner*—Michael Marcheschi
*Attorney, Agent, or Firm*—Oblon, Spivak, McClelland, Maier & Neustadt

[57] ABSTRACT

An aluminum nitride sintered body containing 1 to 10% by weight of an oxide of at least one element selected from a group consisting of a group IIIa element, Ca, Sr and Ba, the concentration of a Si component in the sintered body is 0.01 to 0.2% by weight and three-point bending strength is 490 MPa or more. The sintered body is characterized in that a crystal structure composed of aluminum nitride crystal grains is formed, the fracture toughness is 2.8 MN/m$^{3/2}$ or more, the three-point bending strength is 490 MPa or more and the thermal conductivity is 150 W/m·k or more. In the crystal structure, the distribution of the crystal grain distribution is adequately adjusted. The growth of the AlN sintered body is restricted, thus the structure of the sintered body is fined, and the distribution of the crystal grain size is controlled adequately so that the strength and the fracture toughness of the sintered body are improved. Moreover, the mechanical Strength and fracture toughness are improved without impairing the heat radiating characteristics of the aluminum nitride.

7 Claims, 3 Drawing Sheets

ALUMINUM NITRIDE SINTERED BODY AND METHOD FOR MANUFACTURING THE SAME

BACKGROUND OF THE INVENTION

FIELD OF THE INVENTION

The present invention relates to an aluminum nitride sintered body for use as a semiconductor board or the like and a method of manufacturing the same, and more particularly to an aluminum nitride sintered body and a method of manufacturing the same capable of significantly improving strength and fracture toughness and exhibiting excellent heat radiation characteristics while maintaining thermal conductivity peculiar to the aluminum nitride.

DESCRIPTION OF THE RELATED ART

A ceramic sintered body having a variety of excellent characteristics, such as strength, heat resistance, corrosion resistance, wear resistance and light weight and the like, as compared with the conventional metal material has been widely used in a mechanical part, functional part, structural material and decorative material for forming a semiconductor board, electronic equipment material, engine part, material for a high-speed cutting tool, nozzle, bearing or the like that is used in severe temperature, stress and wear conditions under which conventional metal materials cannot be used satisfactorily.

Since an aluminum nitride (AlN) sintered body is an insulating body having excellent thermal conductivity and a thermal expansion coefficient near that of silicon (Si), it has been further widely used as a heat radiation plate or a substrate of a highly-integrated semiconductor apparatus.

The aluminum nitride sintered body has been usually mass-produced by the following manufacturing method. That is, a sintering agent, an organic binder and, if necessary, any of various additives, a solvent and a dispersant are added to a raw material powder of aluminum nitride. The obtained raw material powder mixture is, by a doctor blade method or a slip casting method, molded into a thin-plate shape or sheet-shape molded body or is press-molded into a thick-plate or a large-size molded body. Then, the thus obtained molded body is, in the air or nitrogen atmosphere, heated and dewaxed so that carbon hydride component and the like used as the organic binder is removed from the molded body and is dewaxed. The dewaxed molded body is, in nitrogen atmosphere or the like, heated to high temperature so as to be densified and sintered so that an aluminum nitride sintered body is formed.

In a case where very fine raw material powder having an average grain size of about 0.5 μm or less is used as the raw material AlN powder in the foregoing manufacturing method, a considerably fine sintered body can be obtained even if the AlN powder is used solely. However, a large quantity of impurities, such as oxygen is, in the sintering period, solid-dissolved in AlN crystal lattices or a composite oxide, such as Al-O-N, which hinders the propagation of the oscillations of the lattices, is generated, thus causing the AlN sintered body using no sintering agent to have a relatively low thermal conductivity.

In a case where AlN powder having an average grain size of 1 μm or larger is used as the raw material powder, sole use of the raw material powder cannot realize satisfactory sintering characteristics. Therefore, it is difficult to obtain a sintered body having high density if no agent is added, except the hot pressing method. In this case, a problem arises in that the mass-productivity is unsatisfactory. Accordingly, a sintered body has been usually and efficiently manufactured by a normal-pressure sintering method in such a way that the sintered body is densified and solid dissolving of impure oxygen in the raw material AlN powder into AlN crystal grains is prevented by adding a rare-earth oxide, such as a yttrium oxide ($Y_2O_3$) or an alkali-earth metal oxide, such as a potassium oxide, as a sintering agent.

It is considered that each of the foregoing sintering agents reacts with impure oxygen and $Al_2O_3$ and thus forms a liquid phase so that the sintered body is densified or fined. Moreover, the sintering agent fixes impure oxygen as a boundary grain phase and also realizes high thermal conductivity.

Figure 2:
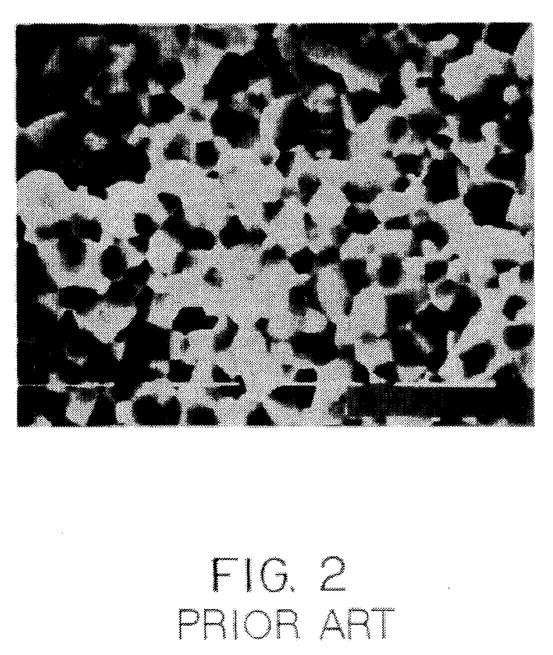
FIG. 2 is a photograph taken with a scanning electronic microscope photograph showing the crystal structure of a conventional aluminum nitride sintered body.

However, the conventional manufacturing method suffers from unsatisfactory wettability between AlN and a liquid-phase compound. Furthermore, the characteristic of the liquid phase of easily segregating causes a trend to occur in that the liquid phase substances eccentrically remain in gap portions among AlN grains and coagulate to form a coarse and brittle grain boundary. What is even worse, growth of the crystal grains easily proceeds and thus large and coarse crystal grains having an average grain size of 5 to 10 μm can easily be formed in the crystal structure of the sintered body as shown in FIG. 2. Furthermore, micro pores cannot be extinguished and retained in the crystal grains, thus preventing fine formation of the sintered body. As a result, there arises a problem in that an aluminum nitride sintered body having unsatisfactory three-point bending strength of about 350 to 400 MPa and insufficient fracture toughness of 2.8 $MN/m^{3/2}$ or less can be obtained.

In order to overcome the foregoing problems, attempts have been made that fine aluminum nitride raw material powder having a uniform grain size is used to form an AlN sintered body having a very fine crystal structure and that an additive is added to improve the sintering characteristics. The inventor of the present invention has disclosed a method having an arrangement that, for example, a tungsten component is contained to improve the sintering characteristics in order to obtain a strong AlN sintered body. However, a fact was found that the fracture toughness deteriorates though the crystal structure can be fined and uniformed and thus the sintered body can be strengthened due to containing of the tungsten component. Therefore, it has been difficult to obtain an AlN sintered body for a semiconductor board having both satisfactory strength and toughness.

In order to cope with a heat generating amount that has been increased in the recent trend of raising the integrating density of semiconductor device and enlarging the output from the same, the aluminum nitride material exhibiting excellent thermal conductivity (satisfactory heat radiation characteristics) has been used widely. Although the aluminum nitride material resulted in satisfactory heat radiation characteristics, the aforesaid unsatisfactory strength and toughness to serve as a structural member result in that a semiconductor board made of an aluminum nitride sintered body is damaged by small bending stress acting when the semiconductor board is mounted on a mounting substrate and by impulsive force acting at handling. As a result, there arises a problem in that the manufacturing yield of the semiconductor circuit boards critically deteriorates.

SUMMARY OF THE INVENTION

The present invention is achieved for solving the foregoing problems and therefore a first object of the present invention is to provide an AlN sintered body and a method of manufacturing the same capable of restricting the growth of the AlN sintered body grains and fining the structure of the sintered body to improve the strength of the sintered body and uniform the same, thereby improving the mechanical strength while maintaining the heat radiation characteristics.

A second object of the present invention is to provide an AlN sintered body and a method of manufacturing the same in which the size of the crystal grains and the grain size distribution of the AlN sintered body are controlled adequately to improve the strength and the fracture toughness of the sintered body so that the mechanical strength is improved while maintaining the heat radiation characteristics.

In order to achieve the foregoing objects, the inventor of the present invention changed the method of synthesizing the aluminum nitride raw material powder, the distribution of the grain size of the AlN raw material powder, type and quantity of addition of a sintering agent and additives to be added to the aluminum nitride raw material powder and investigated the influences of the changes upon the crystal structure, crystal grain size distribution, strength characteristics, fracture toughness and heat transfer characteristics.

As a result, a fine sintered body structure having a grain size of 1 to 4 μm was formed and thus an AlN sintered body exhibiting excellent strength characteristics was obtained when a Si component was added in a small quantity in a composite manner in addition to a predetermined sintering agent.

When a Si component serving as an additive is, in a small quantity, added to a predetermined AlN raw material powder in addition to a sintering agent in a composite manner and their mixture body is molded and sintered, a fine sintered body structure having an average crystal grain size of 2 to 4.5 μm and exhibiting a crystal grain size distribution which is wider than that of a conventional AlN sintered body was obtained and thus an AlN sintered body exhibiting excellent strength characteristics and fracture toughness was obtained. The present invention was established on the basis of the foregoing knowledge.

That is, a first aluminum nitride sintered body according to the present invention is characterized by containing 1 to 10% by weight of an oxide of at least one element selected from a group consisting of a group IIIa element, Ca, Sr and Ba and the concentration of a Si component is 0.01 to 0.2% by weight. It is preferable that the Si component be contained as at least one type of silicon component selected from a group consisting of $SiO_2$, $Si_3N_4$, SiC and $Si_2N_2O$. It is further preferable that at least one type of metal element selected from a group consisting of Ti, Zr, Hf, Nb, Ta, Mo and W be contained by 0.1 to 0.5% by weight calculated as an oxide thereof. It is preferable that the content of positive ions of impurities such as Fe and Mg except group IIIa element, Ca, Sr and Ba be 0.2% by weight or less. Another characteristic is that the average crystal grain size of the sintered body is 1 to 4 μm. In addition, the AlN sintered body composed as described above has a thermal conductivity of 150 W/m·k or more and a three-point bending strength is 490 MPa or more.

A first method of manufacturing an aluminum nitride sintered body according to the present invention comprises the steps of: forming a mixture powder by adding at least one type of element selected from a group consisting of a group IIIa element, Ca, Sr and Ba by 1 to 10% by weight and a Si-component by 0.01 to 0.2% by weight to aluminum nitride raw material powder containing positive ions of impurities except group IIIa element, Ca, Sr and Ba by 0.5% by weight or less to form a molded body; and sintering thus obtained molded body in a temperature range from 1650° C. to 1900° C. in non-oxide atmosphere.

A second aluminum nitride sintered body according to the present invention comprises a crystal structure composed of crystal grains of aluminum nitride, wherein the fracture toughness is 2.8 $MN/m^{3/2}$ or more, the three-point bending strength is 490 MPa or more and the heat conductivity is 150 W/m·k or more. The aluminum nitride sintered body is characterized in that an oxide of at least one element selected from a group consisting of a group IIIa element, Ca, Sr and Ba is contained by 1 to 10% by weight, the concentration of a Si component is 0.01 to 0.2% by weight and the content of $Al_2O_3$ is 1.5% by weight or less. It is preferable that the Si component be contained as at least one type of silicon compound selected from a group consisting of $SiO_2$, $Si_3N_4$, SiC, $Si_2N_2O$, β-Sialon, α-Sialon, poly-type aluminum nitride (Al—Si—O—N). It is further preferable that at least one type of metal element selected from a group consisting of Ti, Fe, Ni, Cr, Co, Li and Mg be contained by 0.05 to 0.5% by weight calculated as an oxide thereof. It is preferable that the content of positive ions of impurities such as Mg except group IIIa element, Ca, Sr and Ba be 0.2% by weight or less. Further, the average crystal grain size of the sintered body may preferably be set to a range of 2 to 4.5 μm. The AlN sintered body composed as described above and having the foregoing wide crystal grain size distribution is characterized in that the thermal conductivity is 150 W/m·k or more, the fracture toughness is 2.8 $MN/m^{3/2}$ or more and the three-point bending strength is 490 MPa or more.

A method of manufacturing the second aluminum nitride sintered body according to the present invention comprises the steps of: forming a mixture powder by adding at least one type of element selected from a group consisting of a group IIIa element, Ca, Sr and Ba by 1 to 10% by weight, an Si component by 0.01 to 0.2% by weight and $Al_2O_3$ by 1.5% or less by weight to aluminum nitride raw material powder to form a molded body; and sintering thus obtained molded body at a temperature range from 1650° C. to 1900° C. in non-oxide atmosphere.

The aluminum nitride (AlN) raw material powder to be used in the method according to the present invention and serving as the main component of the sintered body is fine AlN raw material powder having an average grain size of 0.5 to 2 μm, preferably 1.5 μm or less, to improve the sintering characteristics and the thermal conductivity by restricting the content of impure oxygen to 1.5% by weight or less.

In general, the aluminum nitride raw material powder is manufactured by a direct nitriding synthesis method or reduction nitriding synthesis method. The direct nitriding synthesis method is a method comprising the step of causing arc discharge to undergo in a nitrogen gas flow while using an aluminum metal rod as an electrode in order to form pure AlN in the leading portion of the electrode.

On the other hand, the reduction nitriding synthesis method is a method comprising the steps of mixing black lead or an organic compound serving as a reducing agent with aluminum oxide fine powder, and heating the mixture body in a nitrogen or ammonia gas flow to reduce and nitrify the aluminum oxide in order to synthesize aluminum nitride.

As the raw material powder for use to the aluminum nitride sintered body according to the present invention, either raw material powder manufactured by the foregoing synthesis methods may be used. However, it is preferable that the aluminum nitride raw material powder composed of the two types of raw material powder having different grain size distributions be employed because the grain size distribution can be widened, and thereby the crystal grain size distribution of the obtained sintered body is widened, thus resulting in that an AlN sintered body exhibiting satisfactory strength and fracture toughness can be obtained.

The oxide of a group IIIa element of the periodic table (of a long-period type), Ca, Sr or Ba acts as a sintering agent to densify or fine the AlN sintered body and is added in a quantity ranging from 1% by weight to 10% by weight with respect to the aluminum nitride raw material powder. The sintering agent is exemplified by an oxide of any of rare earth elements (Y, Sc, Ce, Dy or the like), a nitride, an oxide of any alkaline earth metals (Ca) or a substance which forms the foregoing materials by a sintering process. In particular, it is preferable that yttrium oxide ($Y_2O_3$), cerium dioxide ($CeO_2$) or potassium oxide (CaO) be used. If the quantity of the added sintering agent is less than 1% by weight, the effect of improving the sintering characteristics cannot be exhibited sufficiently. In this case, the sintered body cannot be densified or fined, resulting in that a weak sintered body is formed or oxygen is solid-dissolved in AlN crystals, causing formation of a sintered body having a high thermal conductivity to be prevented. If the quantity of the addition is larger than 10% by weight, the effect of the sintering agent is saturated excessively, causing the heat conductivity of the obtained AlN sintered body to deteriorate. What is worse, grain boundary phases are remained in the sintered body in a large quantity and the volume of the grain boundary phases to be removed by heat treatment is too large, thus resulting in that pores or voids are remained in the sintered body. As a result, the contraction ratio is increased and thus deformation easily takes place.

The Si component has an effect of improving the sintering characteristics and lowering the sintering temperature, When it is, in a composite manner, added together with the sintering agent, the growth of the sintered body grains can be prevented and thus a fine AlN crystal structure is formed so as to improve the structural strength of the sintered body.

As the Si component, it is preferable that a silicon compound be used which is exemplified by $SiO_2$, $Si_3N_4$, SiC, $Si_2N_2O$-Sialon, β-Sialon or poly-type aluminum nitride (Al—Si—O—N, where $5/6 \leq (Al+Si)/(O+N) < 1$) or the like. The afore-mentioned poly-type aluminum nitride can be obtained by mixing aluminum nitride powder with silicon dioxide powder in a quantity of 0.1 to 20% by weight and by causing the mixture body to react for 0.5 to 4 hours in, for example, a non-oxide atmosphere. The content of the silicon compound is, in the form of a Si component, adjusted to a range from 0.01 to 0.2% by weight. If the content of the Si component is less than 0.01%, the effect of restricting the growth of the grains becomes unsatisfactory. In this case, a coarse crystal structure is formed and thus a strong AlN sintered body cannot be obtained. If the same is added excessively in a quantity larger than 0.2% by weight, the thermal conductivity of the sintered body deteriorates and the bending strength sometimes deteriorates.

The oxide of Ti, Zr, Hf, Nb, Ta, Mo or W lowers the sintering temperature to improve the sintering characteristics while enabling the sintered body to be colored so as to form an opaque sintered body. Moreover, the oxide is used effectively to improve the characteristics of the AlN sintered body. It may be added in a quantity ranging from 0.1 to 0.5% by weight calculated as oxide. If the quantity of the addition is less than 0.1% by weight, the foregoing effect of improving the characteristics becomes insufficient. If the same exceeds 0.5% by weight, the thermal conductivity of the AlN sintered body deteriorates similarly to another impurity.

Since positive ions of Fe, Mg or the like except group IIIa element, Ca, Sr and Ba easily form a compound that inhibits the thermal conduction of the AlN sintered body, the content of the same in the AlN sintered body is made to be 0.2% by weight or less.

The oxide of Fe or the like is able to effectively improve the toughness of the sintered body as described later on. In a case where a high toughness is required in place of improving the thermal conductivity, it is preferable that the oxide of Fe or the like be positively added or formed so as to be disposed in the AlN sintered body in a quantity ranging from 0.05 to 0.5% by weight.

$Al_2O_3$ improves the fracture toughness of the AlN sintered body. The content of $Al_2O_3$ is adjusted to a range of 1.5% by weight or less. If the content of $Al_2O_3$ exceeds 1.5% by weight, the thermal conductivity of the sintered body deteriorates. A preferred content of $Al_2O_3$ is 1% by weight or less. As a method of adding the $Al_2O_3$ component, any of the following methods may be employed: a method in which $Al_2O_3$ is added individually as an additive, a method in which $Al_2O_3$ generated due to oxidation at the time of crushing the AlN raw material is mixed and added, and a method in which AlN raw material powder is heated in atmosphere containing oxygen and $Al_2O_3$ generated due to surface oxidation is added.

In a case where the AlN raw material powder manufactured by the direct nitriding synthesis method is used, somewhat effective strength and fracture toughness can be realized even if no $Al_2O_3$ component is added. However, in a case where the AlN raw material powder manufactured by the reduction nitriding synthesis method is used, it is confirmed that the addition of the $Al_2O_3$ component significantly improves the fracture toughness.

The oxide of Ti, Fe, Ni, Cr, Co, Li or Mg lowers the sintering temperature and thus improves the sintering characteristics. Furthermore, the oxide is able to effectively improve the characteristics of the AlN sintered body such that it colors the sintered body to form an opaque sintered body. It may be added in a quantity ranging from 0.05 to 0.5% by weight calculated as oxide thereof. If the quantity of the addition is less than 0.05% by weight, the foregoing effect of improving the characteristics becomes insufficient. If the same exceeds 0.5% by weight, the thermal conductivity of the AlN sintered body deteriorates similarly to another impurity.

The AlN raw material powder, the selected sintering agent, the Si compound serving as the Si component and $Al_2O_3$ added if necessary are injected into a crushing mixer, such as a ball mill, so as to be mixed for a predetermined time. As a result, a mixture of the raw materials is formed. Then, the thus obtained mixture of the raw materials is injected into a mold having a predetermined shape so as to be pressurized and molded. As a result, a molded body is formed. If an organic binder, such as paraffin or stearic acid, is added by 5 to 10% by weight, the molding process can be performed smoothly.

As the molding method, any of the following methods may be employed: a general press-molding method, slurry (slip) casting method, a static hydraulic pressing method or a sheet molding method, such as a doctor blade method.

After the foregoing operation has been completed, the molded body is heated to 400° to 500° C. in the air or heated in non-oxidation atmosphere, for example, nitrogen gas atmosphere to 400° to 800° C. so as to sufficiently dewax and remove the organic binder added previously.

A plurality of the dewaxed sheet-like molded bodies are stacked in a sintering furnace through a releasing agent (releasing powder) made of, for example, ceramic sintered powder. In the foregoing state, the plurality of the molded bodies are collectively sintered at a predetermined temperature. The sintering process is performed in non-oxidation atmosphere by heating the molded bodies at 1650° to 1900° C. for 2 to 10 hours. By adding the Si component, the sintering process can be performed at a lower temperature of 1720° to 1780° C. as compared with the conventional technology. Although the atmosphere for the sintering process is required to be non-oxidation atmosphere, the process is usually performed in nitrogen gas atmosphere or in atmosphere containing nitrogen gas. As the reducing gas, $H_2$ gas or CO gas may be used. The sintering process may be performed in vacuum (containing reducing atmosphere in a small quantity), reduced-pressure, pressure-raised or normal pressure atmosphere. If sintering is performed at a low temperature, for example, lower than 1650° C., it is difficult to densify or fine the structure although the degree of the difficulty depends upon the grain size of the raw material powder and the content of oxygen. In this case, the characteristics, such as the strength and the thermal conductivity, become unsatisfactory. If the sintering is performed at a temperature higher than 1900° C., the vapor pressure of AlN in the sintering furnace is raised excessively, so that it becomes difficult to densify the structure. What is worse, there is a risk of rapidly deteriorating the thermal conductivity. Therefore, the sintering temperature is determined to the foregoing range.

By molding, dewaxing and sintering the raw material mixture body having a predetermined composition in which the sintering agent and Si component are added to the AlN raw material powder, a strong AlN sintered body can be obtained which has a fine crystal structure, the average crystal grain size of which is 2.0 to 4.5 µm, the thermal conductivity of which is 150 W/m·k or more and the bending strength of which is 490 MPa or more.

According to the thus structured first aluminum nitride sintered body and a method of manufacturing the same, the AlN sintered body is formed by adding, in a composite manner, the oxide of group IIIa element, Ca, Sr or Ba and the Si component in a predetermined quantity. Therefore, the Si component effectively prevents the growth of crystal grains, thus enabling a fine crystal structure to be formed. As a result, an aluminum nitride sintered body having excellent strength characteristics can be obtained.

By molding, dewaxing and sintering the raw material mixture body having a predetermined composition realized by adding the sintering agent and Si component to the AlN raw material powder, a strong and tough AlN sintered body can be obtained which has a fine crystal structure, the average crystal grain size of which is 2 to 4.5 µm, in which the crystal grain size distribution is realized such that the ratio of crystal grains having a grain size of less than 1 µm is 10% by volume or less, the ratio of crystal grains having a grain size of 1 µm or more and less than 2 µm is 10 to 20% by volume, the ratio of crystal grains having a grain size of 2 µm or more and less than 3 µm is 10 to 30% by volume, the ratio of crystal grains having a grain size of 3 µm or more and less than 4 µm is 30 to 50% by volume, the ratio of crystal grains having a grain size of 4 µm or more and less than 5 µm is 5 to 10% by volume and the ratio of crystal grains having a grain size of 5 µm is 10% by volume or less, the heat conductivity of which is 150 W/m·k or more, the bending strength of which is 490 MPa or more and the fracture toughness of which is 2.8 MN/m$^{3/2}$ or more.

According to the thus structured second aluminum nitride sintered body and the method of manufacturing the same, the Si component in a predetermined quantity and if necessary $Al_2O_3$ are added in a composite manner together with the sintering agent made of an oxide of group IIIa element, Ca, Sr or Ba to form the AlN sintered body. Therefore, a crystal structure can be obtained in which the size of the crystal grain size and the grain size distribution are adequately controlled by the Si component. Therefore, an aluminum nitride sintered body exhibiting excellent strength characteristics and fracture toughness can be obtained.

Other and further objects, features and advantages of the invention will be appear more fully from the following description.

DESCRIPTION OF THE PREFERRED EMBODIMENTS

With reference to the following examples, an aluminum nitride sintered body according to the present invention will now be described further in detail.

Examples 1 to 26

Predetermined quantities of additives such as $Y_2O_3$, $WO_3$, $TiO_2$, $ZrO_2$, $HfO_2$, $Nb_2O_5$, $Ta_2O_5$, $MoO_3$, CaO, BaO, SrO, $Nd_2O_5$ shown in Table 1 were added, as Si components and sintering agents, to aluminum nitride powder having an average grain size of 1 µm and containing 0.8% by weight of oxygen as an impurity, thereby to prepare respective powder mixtures. Then, each of the powder mixtures was added into ethyl alcohol as a solvent and mixed in a ball mill for 20 hours, so that a raw material mixture was prepared. Then, 5.5% by weight of polyvinyl alcohol (PVA) serving as an organic binder was added to the raw material mixture, so that granules were prepared.

Each of the obtained granules was injected into a mold of a press machine so as to be compressed in a single axial direction under pressure of 1200 kg/cm$^2$, so that a multiplicity of rectangular molded bodies each having a size of 50 mm×50 mm and 5 mm thick were manufactured. Then, each molded body was heated at 450° C. for one hour in the air, so that dewaxing was performed.

Then, each of the dewaxed molded bodies was accommodated into a sintering chamber made of AlN so as to be sintered in a sintering furnace into densified bodies at 1720° C. to 1780° C., which was the lowest temperature of sintering as shown in Table 1. Then, the densified bodies were cooled at a cooling rate of 200° C./hour, so that AlN sintered bodies according to Examples 1 to 26 were manufactured.

Comparative Example 1

A raw material was prepared and molding, dewaxing and sintering were performed under the same conditions as those of Example 1 except that no Si component was added, a conventional sintering agent was added and sintering was performed at 1800° C., so that an AlN sintered body according to Comparative Example 1 was manufactured.

Comparative Example 2

A similar process to that according to Example 3 was performed except that $SiO_2$ serving as the Si component was added in an excess quantity of 0.3% by weight (calculated as Si), so that an AlN sintered body according to Comparative Example 2 was manufactured.

Comparative Example 3

A similar process to that according to Example 3 was performed except that $Y_2O_3$ serving as the sintering agent was added in an excess quantity of 15% by weight and sintering was performed at 1800° C., so that an AlN sintered body according to Comparative Example 3 was manufactured.

Comparative Example 4

A similar process to that according to Example 11 was performed except that 1% by weight of $WO_3$ also serving as the sintering agent was added in addition to $Y_2O_3$, and $Si_3N_4$ serving as the Si component was added in an excess quantity of 0.3% by weight (calculated as Si) and sintering was performed at 1800° C., so that an AlN sintered body according to Comparative Example 4 was manufactured.

In order to evaluate the strength characteristics and the heat radiating characteristics of the thus obtained AlN sintered bodies according to Examples 1 to 26 and Comparative Examples 1 to 4, the three-point bending strength, thermal (heat) conductivity and average crystal grain size (D50) of each sample were measured. Thus, results shown in the following Table 1 were obtained. The average crystal grain size (D50) was defined to be the grain size corresponding to the position at which the sum of each volume ratio from small grain sizes to coarse grain size reaches 50% by volume on a grain size distribution curve indicating the ratio of crystal grains with respect to each grain size.

TABLE 1

| Sample No. | Ratio of Raw Material Mixture (% by weight) | | | | | | | Lowest Temperature for Sintering (°C.) | Characteristics of Sintered Body | | |
|---|---|---|---|---|---|---|---|---|---|---|---|
| | Sintering Agent Component | | | | Si Component | | | | Three-Point Bending Strength (MPa) | Thermal Condutivity (W/m · K) | Grain Size D50 (μm) |
| | Type | Quantity of addition | Type | Quantity of addition | Calculated as Si | Source of addition | AlN | | | | |
| Ex. 1 | $Y_2O_3$ | 5 | — | — | 0.01 | $SiO_2$ | Bal. | 1760 | 510 | 182 | 4 |
| Ex. 2 | $Y_2O_3$ | 5 | — | — | 0.05 | $SiO_2$ | Bal. | 1760 | 580 | 178 | 3 |
| Ex. 3 | $Y_2O_3$ | 5 | — | — | 0.1 | $SiO_2$ | Bal. | 1740 | 600 | 175 | 3 |
| Ex. 4 | $Y_2O_3$ | 5 | — | — | 0.2 | $SiO_2$ | Bal. | 1740 | 560 | 168 | 3.5 |
| Ex. 5 | $Y_2O_3$ | 3 | — | — | 0.1 | $SiO_2$ | Bal. | 1740 | 600 | 170 | 3 |
| Ex. 6 | $Y_2O_3$ | 7.5 | — | — | 0.1 | $SiO_2$ | Bal. | 1750 | 580 | 183 | 3 |
| Ex. 7 | $Y_2O_3$ | 5 | — | — | 0.1 | $Si_3N_4$ | Bal. | 1740 | 600 | 177 | 3 |
| Ex. 8 | $Y_2O_3$ | 5 | — | — | 0.1 | SiC | Bal. | 1740 | 580 | 173 | 3 |
| Ex. 9 | $Y_2O_3$ | 5 | — | — | 0.1 | $Si_2N_2O$ | Bal. | 1740 | 590 | 175 | 3 |
| Ex. 10 | $Y_2O_3$ | 5 | $WO_3$ | 0.3 | 0.1 | $SiO_2$ | Bal. | 1750 | 560 | 174 | 3 |
| Ex. 11 | $Y_2O_3$ | 5 | $WO_3$ | 0.3 | 0.1 | $Si_3N_4$ | Bal. | 1740 | 620 | 179 | 3 |
| Ex. 12 | $Y_2O_3$ | 5 | $WO_3$ | 0.3 | 0.1 | SiC | Bal. | 1740 | 580 | 172 | 3 |
| Ex. 13 | $Y_2O_3$ | 5 | $WO_3$ | 0.3 | 0.1 | $Si_2N_2O$ | Bal. | 1740 | 580 | 174 | 3 |
| Ex. 14 | $Y_2O_3$ | 5 | $TiO_2$ | 0.2 | 0.1 | $Si_3N_4$ | Bal. | 1730 | 600 | 175 | 3 |
| Ex. 15 | $Y_2O_3$ | 5 | $ZrO_2$ | 0.2 | 0.1 | $Si_3N_4$ | Bal. | 1730 | 630 | 173 | 2.5 |
| Ex. 16 | $Y_2O_3$ | 5 | $HfO_2$ | 0.2 | 0.1 | $Si_3N_4$ | Bal. | 1720 | 630 | 175 | 2.5 |
| Ex. 17 | $Y_2O_3$ | 5 | $Nb_2O_5$ | 0.2 | 0.1 | $Si_3N_4$ | Bal. | 1720 | 610 | 172 | 3 |
| Ex. 18 | $Y_2O_3$ | 5 | $Ta_2O_5$ | 0.3 | 0.1 | $Si_3N_4$ | Bal. | 1730 | 570 | 170 | 3 |
| Ex. 19 | $Y_2O_3$ | 5 | $MoO_3$ | 0.3 | 0.1 | $Si_3N_4$ | Bal. | 1740 | 550 | 170 | 3 |
| Ex. 20 | — | — | CaO | 3 | 0.05 | $SiO_2$ | Bal. | 1780 | 520 | 160 | 3.5 |
| Ex. 21 | — | — | BaO | 3 | 0.05 | $SiO_2$ | Bal. | 1780 | 510 | 157 | 3.5 |
| Ex. 22 | — | — | SrO | 3 | 0.05 | $SiO_2$ | Bal. | 1780 | 530 | 158 | 3.5 |
| Ex. 23 | — | — | $Nd_2O_5$ | 5 | 0.1 | $SiO_2$ | Bal. | 1750 | 570 | 168 | 3 |
| Ex. 24 | $Y_2O_3$ | 10 | — | — | 0.1 | $SiO_2$ | Bal. | 1760 | 510 | 167 | 4 |
| Ex. 25 | $Y_2O_3$ | 1 | — | — | 0.01 | $SiO_2$ | Bal. | 1780 | 520 | 158 | 3.5 |
| Ex. 26 | $Y_2O_3$ | 5 | $WO_3$ | 0.5 | 0.1 | $Si_3N_4$ | Bal. | 1760 | 620 | 170 | 2.5 |
| C. Ex. 1 | $Y_2O_3$ | 5 | — | — | — | — | Bal. | 1800 | 400 | 190 | 5.5 |
| C. Ex. 2 | $Y_2O_3$ | 5 | — | — | 0.3 | $SiO_2$ | Bal. | 1740 | 520 | 148 | 4 |
| C. Ex. 3 | $Y_2O_3$ | 15 | — | — | 0.1 | $SiO_2$ | Bal. | 1800 | 450 | 158 | 5 |
| C. Ex. 4 | $Y_2O_3$ | 5 | $WO_3$ | 1 | 0.3 | $Si_3N_4$ | Bal. | 1800 | 470 | 149 | 4 |

Ex.: Example, C. Ex.: Comparative Example

As can be understood from Table 1, the AlN sintered bodies according to Examples 1 to 26 in which the Si components were added in small quantities in addition to the sintering agents such as $Y_2O_3$ and CaO resulted in very fine crystal grain size of 2.5 to 4 μm and in excellent bending strength and satisfactory thermal conductivity.

Although the AlN sintered body according to Comparative Example 1 containing no Si component exhibited superior thermal conductivity to that of each of Examples 1 to 26, the obtained bending strength was unsatisfactory and there arises a problem of insufficient durability and handling facility. The samples according to Comparative Examples 2 and 4 each containing the Si component in an excess quantity added thereto resulted in insufficient thermal conductivity. The sample according to Comparative Example 4 to which $Y_2O_3$ serving as the conventional sintering agent was added in an excess quantity resulted in that its thermal conductivity and strength deteriorate excessively though the Si component was added.

Figure 1:
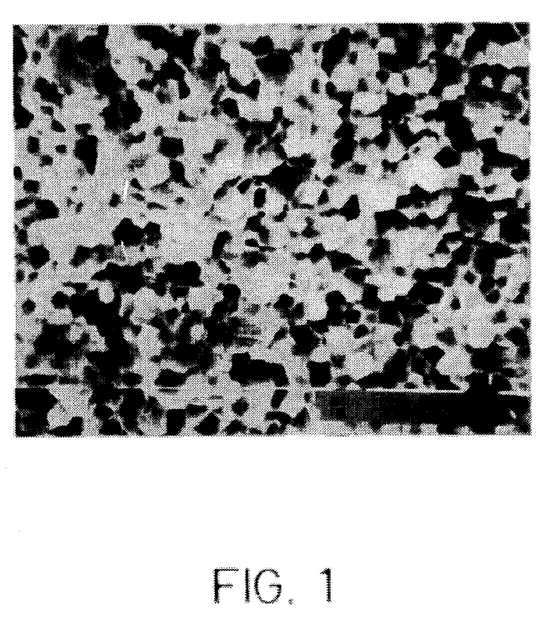
FIG. 1 is a photograph taken with a scanning electronic microscope photograph showing the crystal structure of an aluminum nitride sintered body according to the present invention.

The surface of each AlN sintered body according to Example 1 to 26 was observed by a scanning electronic microscope (SEM). As a result, uniform formation of dispersed grain boundaries around fine AlN crystal grains was observed as shown in FIG. 1. The sintered body according to Comparative Example 1 resulted in unsatisfactory effect of restricting the growth of grains obtainable from addition of the Si component. Therefore, coarse AlN grains were formed as shown in FIG. 2 and coarse grain boundaries are formed around adjacent AlN grains in a coagulated manner.

As described above, the aluminum nitride sintered body and the method of manufacturing the same according to the foregoing examples have the arrangement that the AlN sintered body is formed by adding the Si component in a predetermined quantity in a composite manner in addition to the sintering agent consisting of an oxide of group IIIa element, Ca, Sr and Ba. Therefore, the growth of crystal grains due to the Si component can effectively be prevented and thus fine crystal structure can be obtained. Therefore, an aluminum nitride sintered body exhibiting excellent strength characteristics can be obtained.

Examples 27 to 56

Three types of aluminum nitride raw material powder were prepared which were consisting of aluminum nitride powder (A) manufactured by a reduction nitriding synthesis method, containing 0.8% by weight of oxygen as an impurity and having an average grain size of 1 μ m, aluminum nitride powder (B) manufactured by direct nitriding synthesis method, containing 1.2% by weight of oxygen as an impurity and having an average grain size of 1.3 μ m, and aluminum nitride powder (C) prepared by mixing the aluminum nitride powder (A) and the aluminum nitride powder (B) at a weight ratio of 1:1. As Si components and sintering agents, $Y_2O_3$, $TiO_2$, $Fe_2O_3$, NiO, $Cr_2O_3$, CoO, $Li_2O$, MgO, $SiO_2$, $Si_3N_4$, SiC, $Si_2N_2O$, α-Sialon, β-Sialon, poly-type AlN, CaO, BaO, SrO and $Al_2O_3$ were added in respective predetermined quantities to the three types of the aluminum nitride raw material powder as shown in Tables 2 and 3. While using ethyl alcohol as a solvent, the foregoing substances were mixed in a ball mill for 20 hours, so that a respective raw material mixture was prepared. Then, 5.5% by weight of polyvinyl alcohol (PVA) serving as an organic binder was added to the respective raw material mixture, so that granules were prepared.

Each of the obtained granules was injected into a mold of a press machine so as to be compressed in a single axial direction under pressure of 1200 kg/cm², so that a multiplicity of rectangular molded bodies each having a size of 50 mm×50 mm and 5 mm thick were manufactured. Then, each molded body was heated at 450° C. for one hour in the air, so that dewaxing was performed.

Then, each of the dewaxed molded bodies was injected into a sintering chamber made of AlN so as to be sintered for four hours in a sintering furnace into densified bodies at 1720° to 1780° C., which was the lowest temperature of sintering shown in Tables 2 and 3. Then, the densified bodies were cooled at a cooling rate of 200° C./hour, so that AlN sintered bodies according to Examples 27 to 56 were manufactured.

Comparative Example 5

Preparation of the raw material, molding, dewaxing and sintering were performed under the same conditions as that of Example 27 except that no Si component was added, a conventional sintering agent was added and sintering was performed at 1800° C., so that an AlN sintered body according to Comparative Example 5 was manufactured.

Comparative Example 6

A similar process to that according to Example 29 was performed except that $SiO_2$ serving as the Si component was added in an excess quantity of 0.3% by weight (calculated as Si), so that an AlN sintered body according to Comparative Example 6 was manufactured.

Comparative Example 7

A similar process to that according to Example 29 was performed except that $Y_2O_3$ also serving as the sintering agent was added in an excess quantity of 15% by weight and sintering was performed at 1800° C., so that an AlN sintered body according to Comparative Example 7 was manufactured.

Comparative Example 8

A similar process to that according to Example 42 was performed except that 1% by weight of $TiO_2$ serving as the sintering agent was added in addition to $Y_2O_3$, and $Si_3N_4$ serving as the Si component was added in an excess quantity of 0.3% by weight (calculated as Si) and sintering was performed at 1760° C., so that an AlN sintered body according to Comparative Example 8 was manufactured.

Comparative Example 9

A similar process to that according to Example 42 was performed except that 1% by weight of $WO_3$ also serving as the sintering agent was added in addition to $Y_2O_3$, and $Si_3N_4$ serving as the Si component was added in an excess quantity of 0.3% by weight (calculated as Si) and sintering was performed at 1760° C., so that an AlN sintered body according to Comparative Example 9 was manufactured.

Comparative Example 10

Preparation of the raw material, molding, dewaxing and sintering were performed under the same conditions as that of Example 42 except that no Si component was added, and 0.2% by weight of $TiO_2$ serving as the sintering agent was added in addition to the conventional sintering agent and sintering was performed at 1800° C., so that an AlN sintered body according to Comparative Example 10 was manufactured.

Comparative Example 11

A similar process to that according to Example 46 was performed except that 0.2% by weight $TiO_2$ also serving as the sintering agent was added in addition to $Y_2O_3$, and $Si_3N_4$ serving as the Si component was added in an excess quantity of 0.05% by weight (calculated as Si), and $Al_2O_3$ was added in an excess quantity of 2% by weight and sintering was performed at 1760° C., so that an AlN sintered body according to Comparative Example 11 was manufactured.

Comparative Examples 12 and 13

Preparation of the raw material, molding, dewaxing and sintering were performed under the same conditions as that of Example 27 except that no Si component was added and only the conventional sintering agent was added to the AlN raw materials (B) and (C) according to Examples 34 and 35 and sintering was performed at 1800° C., so that AlN sintered bodies having the same dimensions and according to Comparative Examples 12 and 13 were manufactured.

In order to evaluate the strength characteristics and the heat radiating characteristics of the thus obtained AlN sintered bodies according to Examples 27 to 56 and Comparative Examples 5 to 13, the three-point bending strength, thermal conductivity, average crystal grain size (D50) of each sample and grain size distribution of crystal grains were measured. Thus, results shown in the following Tables 4 and 5 were obtained. The fracture toughness was a value measured by a Niihara method in a microindentation method.

TABLE 2

| | Ratio of Raw Material Mixture (% by weight) | | | | | | | | |
|---|---|---|---|---|---|---|---|---|---|
| | Sintering Agent Component | | | | Si Component | | AlN Powder | | |
| Sample No. | Type | Quantity of Addition | Type | Quantity of Addition | Calculated as Si | Source of Addition | Type | Quantity of Addition | Lowest Temp. for Sintering (° C.) |
| Examples | | | | | | | | | |
| 27 | $Y_2O_3$ | 5 | — | — | 0.01 | $SiO_2$ | A | Bal. | 1760 |
| 28 | $Y_2O_3$ | 5 | — | — | 0.05 | $SiO_2$ | A | Bal. | 1760 |
| 29 | $Y_2O_3$ | 5 | — | — | 0.1 | $SiO_2$ | A | Bal. | 1740 |
| 30 | $Y_2O_3$ | 5 | — | — | 0.2 | $SiO_2$ | A | Bal. | 1740 |
| 31 | $Y_2O_3$ | 3 | — | — | 0.1 | $SiO_2$ | A | Bal. | 1740 |
| 32 | $Y_2O_3$ | 10 | — | — | 0.1 | $SiO_2$ | A | Bal. | 1760 |
| 33 | $Y_2O_3$ | 1 | — | — | 0.1 | $SiO_2$ | A | Bal. | 1780 |
| 34 | $Y_2O_3$ | 5 | — | — | 0.05 | $SiO_2$ | B | Bal. | 1780 |
| 35 | $Y_2O_3$ | 5 | — | — | 0.05 | $SiO_2$ | C | Bal. | 1760 |
| 36 | $Y_2O_3$ | 5 | — | — | 0.1 | $Si_3N_4$ | A | Bal. | 1740 |
| 37 | $Y_2O_3$ | 5 | — | — | 0.05 | SiC | A | Bal. | 1760 |
| 38 | $Y_2O_3$ | 5 | — | — | 0.1 | $Si_2N_2O$ | A | Bal. | 1760 |
| 39 | $Y_2O_3$ | 5 | — | — | 0.1 | α-Sialon | A | Bal. | 1760 |
| 40 | $Y_2O_3$ | 5 | — | — | 0.1 | β-Sialon | A | Bal. | 1760 |
| 41 | $Y_2O_3$ | 5 | — | — | 0.1 | Poly-type AlN | A | Bal. | 1760 |
| 42 | $Y_2O_3$ | 5 | $TiO_2$ | 0.2 | 0.05 | $Si_3N_4$ | A | Bal. | 1730 |
| 43 | $Y_2O_3$ | 5 | $TiO_2$ | 0.5 | 0.05 | $Si_3N_4$ | A | Bal. | 1720 |
| 44 | $Y_2O_3$ | 5 | $Fe_2O_3$ | 0.1 | 0.1 | $Si_3N_4$ | A | Bal. | 1730 |
| 45 | $Y_2O_3$ | 5 | $TiO_2$ $Al_2O_3$ | 0.2 0.5 | 0.05 | $Si_3N_4$ | A | Bal. | 1730 |
| 46 | $Y_2O_3$ | 5 | $TiO_2$ $Al_2O_3$ | 0.2 1 | 0.05 | $Si_3N_4$ | A | Bal. | 1740 |
| 47 | $Y_2O_3$ | 5 | $TiO_2$ $Al_2O_3$ | 0.2 0.1 | 0.05 | $Si_3N_4$ | A | Bal. | 1740 |
| 48 | $Y_2O_3$ | 5 | $TiO_2$ | 0.2 | 0.05 | $Si_3N_4$ | B | Bal. | 1760 |
| 49 | $Y_2O_3$ | 5 | $TiO_2$ | 0.2 | 0.1 | $Si_3N_4$ | C | Bal. | 1740 |
| 50 | $Y_2O_3$ | 5 | NiO | 0.1 | 0.1 | $Si_3N_4$ | A | Bal. | 1740 |
| 51 | $Y_2O_3$ | 5 | $Cr_2O_3$ | 0.1 | 0.1 | $Si_3N_4$ | A | Bal. | 1740 |
| 52 | $Y_2O_3$ | 5 | CoO | 0.1 | 0.1 | $Si_3N_4$ | A | Bal. | 1740 |
| 53 | $Y_2O_3$ | 5 | $Li_2O$ | 0.1 | 0.1 | $SiO_2$ | A | Bal. | 1740 |
| 54 | $Y_2O_3$ | 3 | MgO | 0.1 | 0.1 | $SiO_2$ | A | Bal. | 1740 |
| 55 | $Y_2O_3$ | 3 | $TiO_2$ | 0.1 | 0.05 | $Si_3N_4$ | A | Bal. | 1780 |
| 56 | $Y_2O_3$ | 3 | — | — | 0.05 | $SiO_2$ | A | Bal. | 1780 |

TABLE 3

| | Ratio of Raw Material Mixture (% by weight) | | | | | | | | |
|---|---|---|---|---|---|---|---|---|---|
| | Sintering Agent Component | | | | Si Component | | AlN Powder | | |
| Sample No. | Type | Quantity of Addition | Type | Quantity of Addition | Calculated as Si | Source of Addition | Type | Quantity of Addition | Lowest Temp. for Sintering (° C.) |
| Comparative Examples | | | | | | | | | |
| 5 | $Y_2O_3$ | 5 | — | — | — | — | A | Bal. | 1800 |
| 6 | $Y_2O_3$ | 5 | — | — | 0.3 | $SiO_2$ | A | Bal. | 1740 |
| 7 | $Y_2O_3$ | 15 | — | — | 0.1 | $SiO_2$ | A | Bal. | 1800 |

TABLE 3-continued

| | Ratio of Raw Material Mixture (% by weight) | | | | | | | | |
|---|---|---|---|---|---|---|---|---|---|
| | Sintering Agent Component | | Si Component | | | | AlN Powder | | |
| Sample No. | Type | Quantity of Addition | Type | Quantity of Addition | Calculated as Si | Source of Addition | Type | Quantity of Addition | Lowest Temp. for Sintering (° C.) |
| 8 | $Y_2O_3$ | 5 | $TiO_2$ | 1 | 0.3 | $Si_3N_4$ | A | Bal. | 1760 |
| 9 | $Y_2O_3$ | 5 | $WO_3$ | 0.3 | 0.1 | $Si_3N_4$ | A | Bal. | 1760 |
| 10 | $Y_2O_3$ | 5 | $TiO_2$ | 0.2 | — | — | A | Bal. | 1800 |
| 11 | $Y_2O_3$ | 5 | $TiO_2$ $Al_2O_3$ | 0.2 2 | 0.05 | $Si_3N_4$ | A | Bal. | 1780 |
| 12 | $Y_2O_3$ | 5 | — | — | — | — | B | Bal. | 1800 |
| 13 | $Y_2O_3$ | 5 | — | — | — | — | C | Bal. | 1800 |

TABLE 4

| | Characteristics of Sintered Body | | | | | | | | | |
|---|---|---|---|---|---|---|---|---|---|---|
| | Three-Point Bending | Fracture Toughness | Thermal Conductivity | Grain Size | Distribution of Crystal Grain Size (Vol %) | | | | | |
| Sample No. | Strength (MPa) | $(MN/m^{3/2})$ | (W/m · K) | D50 (μm) | Less than 1 μm | 1 to less than 2 μm | 2 to less than 3 μm | 3 to less than 4 μm | 4 to less than 5 μm | 5 μm or more |
| Examples | | | | | | | | | | |
| 27 | 500 | 2.88 | 180 | 4 | 0 | 10 | 20 | 50 | 10 | 10 |
| 28 | 570 | 2.90 | 175 | 3 | 5 | 10 | 25 | 40 | 10 | 10 |
| 29 | 590 | 2.90 | 170 | 3 | 10 | 15 | 25 | 45 | 5 | 10 |
| 30 | 548 | 2.85 | 162 | 3.5 | 0 | 10 | 25 | 45 | 10 | 10 |
| 31 | 590 | 2.87 | 165 | 3 | 5 | 10 | 25 | 40 | 10 | 10 |
| 32 | 500 | 2.85 | 165 | 4 | 0 | 10 | 20 | 50 | 10 | 10 |
| 33 | 510 | 2.88 | 153 | 4 | 0 | 10 | 20 | 50 | 10 | 10 |
| 34 | 550 | 3.00 | 176 | 3.5 | 5 | 10 | 25 | 40 | 10 | 10 |
| 35 | 580 | 2.95 | 180 | 3 | 10 | 15 | 25 | 45 | 5 | 0 |
| 36 | 600 | 2.85 | 170 | 3 | 10 | 15 | 25 | 45 | 5 | 0 |
| 37 | 560 | 2.85 | 168 | 3 | 5 | 15 | 20 | 45 | 10 | 10 |
| 38 | 550 | 2.87 | 163 | 3.5 | 0 | 15 | 20 | 45 | 10 | 10 |
| 39 | 570 | 2.85 | 165 | 3.5 | 0 | 15 | 20 | 45 | 10 | 10 |
| 40 | 590 | 2.85 | 168 | 3 | 5 | 20 | 10 | 45 | 10 | 10 |
| 41 | 580 | 2.90 | 160 | 3 | 5 | 10 | 20 | 45 | 10 | 10 |
| 42 | 600 | 2.85 | 170 | 2.5 | 10 | 20 | 30 | 30 | 10 | 0 |
| 43 | 610 | 2.95 | 160 | 3 | 10 | 15 | 25 | 45 | 5 | 0 |
| 44 | 550 | 2.85 | 157 | 3.5 | 0 | 15 | 20 | 45 | 10 | 10 |
| 45 | 570 | 3.00 | 169 | 3 | 10 | 15 | 25 | 45 | 5 | 0 |
| 46 | 510 | 2.90 | 154 | 4 | 0 | 10 | 20 | 50 | 10 | 10 |
| 47 | 570 | 2.95 | 168 | 3.5 | 0 | 15 | 20 | 45 | 10 | 10 |
| 48 | 580 | 2.95 | 170 | 3.5 | 0 | 10 | 25 | 45 | 10 | 10 |
| 49 | 600 | 3.00 | 172 | 3 | 0 | 10 | 30 | 40 | 10 | 10 |
| 50 | 520 | 2.85 | 165 | 4 | 0 | 10 | 20 | 50 | 10 | 10 |
| 51 | 530 | 2.90 | 162 | 4 | 0 | 10 | 20 | 50 | 10 | 10 |
| 52 | 580 | 2.90 | 160 | 3.5 | 0 | 10 | 30 | 45 | 10 | 5 |
| 53 | 520 | 2.85 | 160 | 4 | 0 | 10 | 25 | 50 | 5 | 10 |
| 54 | 540 | 2.90 | 152 | 4 | 5 | 10 | 20 | 45 | 10 | 10 |
| 55 | 510 | 2.85 | 150 | 4 | 0 | 10 | 20 | 50 | 10 | 10 |
| 56 | 500 | 2.80 | 152 | 4 | 0 | 10 | 20 | 50 | 10 | 10 |

TABLE 5

| | Characteristics of Sintered Body | | | | | | | | | |
|---|---|---|---|---|---|---|---|---|---|---|
| | Three-Point Bending | Fracture Toughness | Thermal Conductivity | Grain Size | Distribution of Crystal Grain Size (Vol %) | | | | | |
| Sample No. | Strength (MPa) | $(MN/m^{3/2})$ | (W/m · K) | D50 (μm) | Less than 1 μm | 1 to less than 2 μm | 2 to less than 3 μm | 3 to less than 4 μm | 4 to less than 5 μm | 5 μm or more |
| Comparative Examples | | | | | | | | | | |
| 5 | 400 | 2.70 | 190 | 5.5 | 0 | 0 | 0 | 5 | 35 | 60 |
| 6 | 510 | 2.75 | 145 | 4 | 0 | 0 | 15 | 60 | 25 | 0 |
| 7 | 440 | 2.80 | 155 | 5 | 0 | 0 | 0 | 10 | 40 | 50 |
| 8 | 460 | 2.85 | 145 | 4 | 0 | 5 | 5 | 40 | 40 | 10 |
| 9 | 580 | 2.50 | 172 | 3 | 0 | 10 | 60 | 30 | 0 | 0 |
| 10 | 450 | 2.80 | 180 | 5 | 0 | 0 | 0 | 0 | 45 | 55 |

TABLE 5-continued

| | Characteristics of Sintered Body | | | | | | | | | |
|---|---|---|---|---|---|---|---|---|---|---|
| | Three-Point Bending | Fracture Toughness | Thermal Conductivity | Grain Size | Distribution of Crystal Grain Size (Vol %) | | | | | |
| Sample No. | Strength (MPa) | (MN/m$^{3/2}$) | (W/m · K) | D50 (μm) | Less than 1 μm | 1 to less than 2 μm | 2 to less than 3 μm | 3 to less than 4 μm | 4 to less than 5 μm | 5 μm or more |
| 11 | 550 | 2.90 | 140 | 3.5 | 0 | 15 | 30 | 40 | 15 | 0 |
| 12 | 440 | 2.95 | 178 | 5 | 0 | 0 | 5 | 5 | 35 | 55 |
| 13 | 460 | 2.85 | 180 | 4.5 | 0 | 0 | 0 | 5 | 55 | 40 |

As can be understood from Tables 4 and 5, each of the AlN sintered bodies according to Examples 27 to 56 to which the Si components are added in small quantities in a composite manner in addition to the sintering agent, such as Y$_2$O$_3$ or CaO, forms very fine crystal grains having a grain size of 2 to 4.5 μm. In the crystal structure, the grain size distribution can be controlled such that the ratio of crystal grains having a grain size of less than 1 μm is 10% by volume or less, the ratio of crystal grains having a grain size of 1 μm or more and less than 2 μm is 10 to 20% by volume, the ratio of crystal grains having a grain size of 2 μm or more and less than 3 μm is 10 to 30% by volume, the ratio of crystal grains having a grain size of 3 μm or more and less than 4 μm is 30 to 50% by volume, the ratio of crystal grains having a grain size of 4 μm or more and less than 5 μm is 5 to 10% by volume and the ratio of crystal grains having a grain size of 5 μm or more is 10% by volume or less. Thus, since the grain size distribution of the crystal grains in AlN sintered body is adequately controlled, it was found that excellent fracture toughness and thermal conductivity were realized in addition to satisfactory strength.

Although a portion of the AlN sintered bodies according to Comparative Examples 5, 10, 12 and 13, to which no Si component is added, exhibited superior heat conductivity to those of Examples 27 to 56, the bending strength is generally unsatisfactory and thus they involved insufficient durability and handing facility. The samples according to Comparative Examples 6 and 8, to which the Si component was added in an excess quantity, resulted in unsatisfactory thermal conductivity. The sample according to Comparative Example 7, to which Y$_2$O$_3$ serving as the conventional sintering agent was added in an excess quantity, resulted in unsatisfactory thermal conductivity and strength though the Si component was added.

Although the AlN sintered body according to Comparative Example 9, to which WO$_3$ was added in place of the sintering agent such as TiO$_2$, resulted in similar bending strength and thermal conductivity to those of Examples 27 to 56, however, the fracture toughness was unsatisfactory and thus the durability and handling facility were insufficient. The AlN sintered body according to Comparative Example 11, to which Al$_2$O$_3$ was added in an excess quantity, resulted in similar bending strength and fracture toughness to those of Examples 27 to 56. However, it was confirmed that the thermal conductivity was deteriorated.

Figure 3:
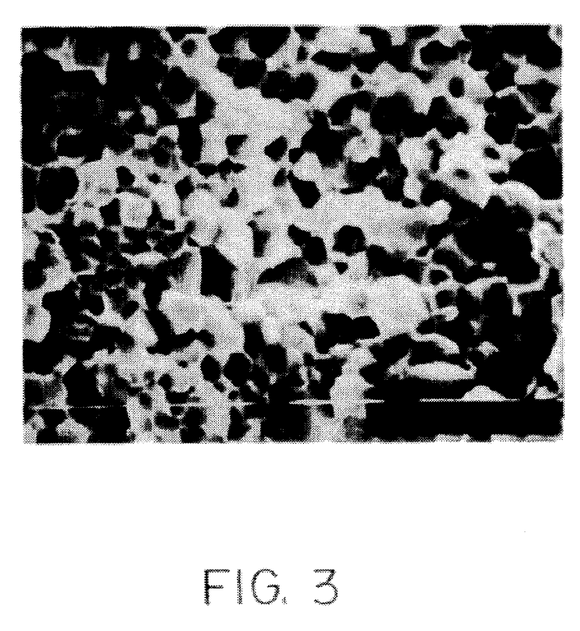
FIG. 3 is a photograph taken with a scanning electronic microscope photograph showing the crystal structure of an aluminum nitride sintered body according to the present invention.
Figure 4:
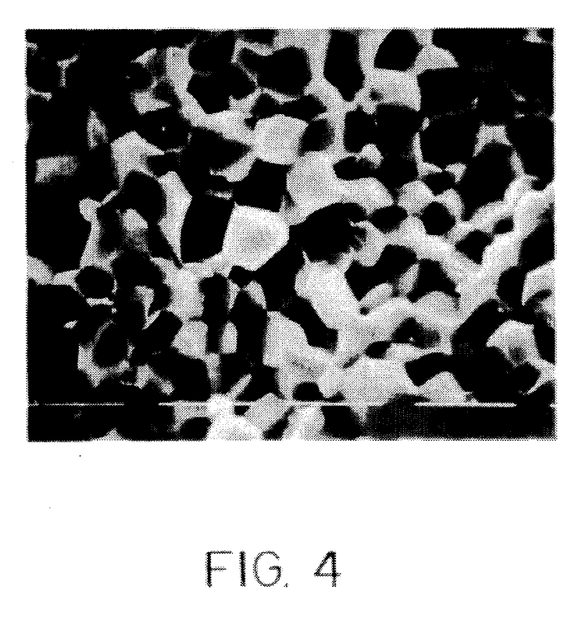
FIG. 4 is a photograph taken with a scanning electronic microscope photograph showing the crystal structure of a conventional aluminum nitride sintered body.

The fractured surface of each of the AlN sintered bodies according to Examples 27 to 56 was observed with a scanning electronic microscope (SEM) as shown in FIG. 3. As a result, fine crystal structures each having a wide distribution of crystal grain sizes were observed and uniform formation of dispersed grain boundaries around fine AlN crystal grains was observed. The sintered bodies according to Comparative Examples 5, 10, 12 and 13 encountered restricted effect of preventing the growth of grains due to the addition of the Si component. Therefore, as shown in FIG. 4, large and coarse AlN grains were formed and large and coarse grain boundaries were formed around adjacent AlN grains in a coagulated manner.

Figure 5:
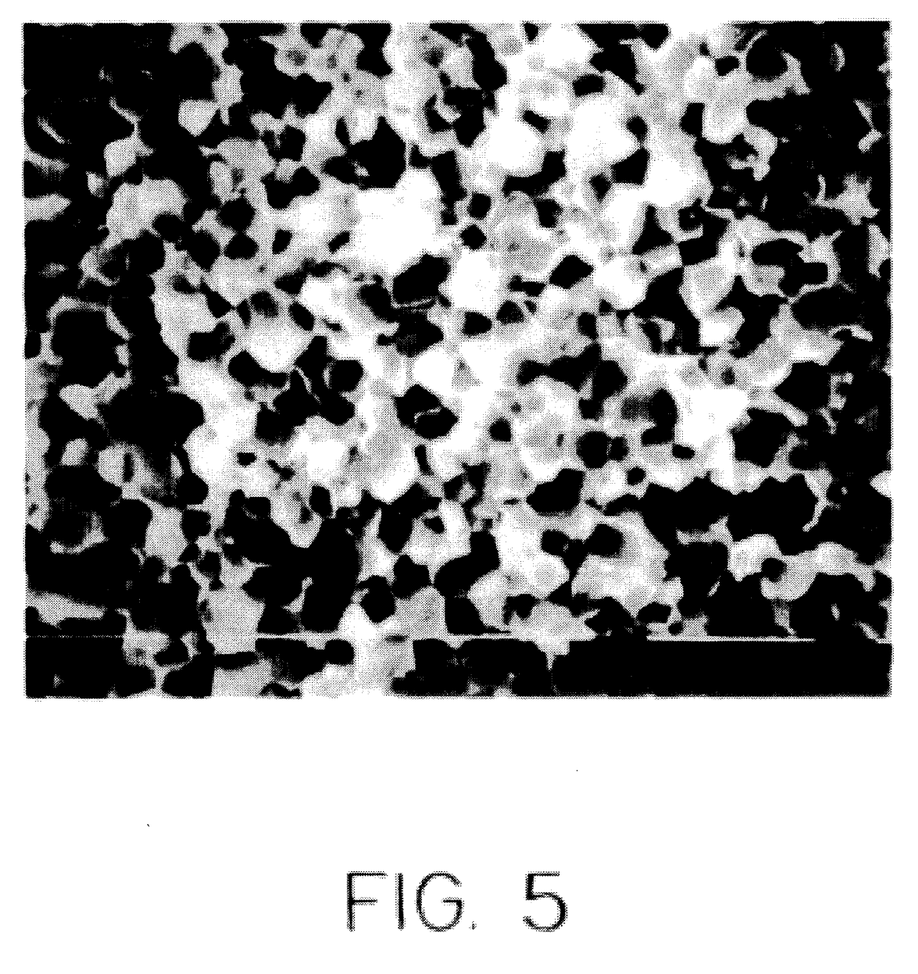
FIG. 5 is a photograph taken with a scanning electronic microscope photograph showing the crystal structure of an aluminum nitride sintered body having a low fracture toughness according to Comparative Example 9.

The sintered body according to Comparative Example 9 encountered excess restriction of the grain growth due to the composite addition of the Si component and WO$_3$ as shown in FIG. 5. As a result, fine crystal structures including uniform crystal grains and having a narrow grain size distribution was formed, thus causing the deterioration in the fracture toughness.

As described above, according to the second aluminum nitride sintered body and the method of manufacturing the same of the present invention, the AlN sintered body formed in such a way that the Si components are, in predetermined quantities, added in addition to the sintering agents composed of the oxides of the group IIIa element, Ca, Sr and Ba effectively prevents the growth of crystal grains due to the Si components and enables fine crystal structures each having a wide grain size distribution to be obtained. Therefore, an aluminum nitride sintered body exhibiting both excellent strength characteristics and fracture toughness can be obtained, Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed,

What is claimed is:

1. An aluminum nitride sintered body comprising:
a crystal structure composed of crystal grains of aluminum nitride, wherein said crystal structure has a ratio of crystal grains having a grain size of less than 1 μm of 10% by volume or less, a ratio of crystal grains having a grain size of 1 μm or more and less than 2 μm of 10 to 20% by volume, a ratio of crystal grains having a grain size of 2 μm or more and less than 3 μm of 10 to 30% by volume, a ratio of crystal grains having a grain size of 3 μm or more and less than 4 μm of 30 to 50% by volume, a ratio of crystal grains having a grain size of 4 μm or more and less than 5 μm of 5 to 10% by volume, and a ratio of crystal grains having a grain size of 5 μm or more of 10% by volume or less; wherein said sintered body has a fracture toughness of 2.8 MN/m$^{3/2}$ or more, a three-point bending strength of 490 MPa or more, and a thermal conductivity of 150 W/m·k or more.

2. An aluminum nitride sintered body according to claim 1, wherein an oxide of at least one element selected from the group consisting of group IIIa elements, Ca, Sr, and Ba is present in an amount of 1 to 10% by weight; an Si component is present in said sintered body in an amount of 0.01 to 0.2% by weight, and $Al_2O_3$ is present in said sintered body in an amount of 1.5% by weight or less.

3. An aluminum nitride sintered body according to claim 2, wherein said Si component is present as at least one type of silicon compound selected from the group consisting of $SiO_2$, $Si_3N_4$, SiC, $Si_3N_2O$, β-Sialon, α-Sialon, and poly-type aluminum nitride (Al—Si—O—N).

4. An aluminum nitride sintered body according to claim 1, wherein at least one type of metal element selected from the group consisting of Ti, Fe, Ni, Cr, Co, Li, and Mg is present in an amount of 0.05 to 0.5% by weight calculated as an oxide thereof.

5. An aluminum nitride sintered body according to claim 1, having positive ions of impurities other than a group IIIa element, Ca, Sr, and Ba present in an amount of 0.2% by weight or less.

6. An aluminum nitride sintered body according to claim 1, wherein said sintered body further comprises 0.05 to 0.5% by weight of Fe.

7. An aluminum nitride sintered body according to claim 1, wherein said sintered body has an average grain size of 1 to 4 μm.

* * * * *